US005580640A

United States Patent [19]

Kraft et al.

[11] Patent Number: 5,580,640

[45] Date of Patent: Dec. 3, 1996

[54] INTEGRATED LABEL HAVING CONTROLLED RELEASE

[75] Inventors: Roger E. Kraft; Merlin F. Mercer; Roy A. Johnson, all of Fort Scott, Kans.

[73] Assignee: Ward/Kraft, Inc., Fort Scott, Kans.

[21] Appl. No.: 186,436

[22] Filed: Jan. 25, 1994

Related U.S. Application Data

[63] Continuation-in-part of Ser. No. 86,185, Jun. 25, 1993, abandoned.

[51] Int. Cl.[6] .......... B23B 3/00

[52] U.S. Cl. .......... 428/195; 428/43; 428/76; 428/174; 428/198; 428/212; 428/488.4; 428/537.5; 428/914; 428/41.8; 283/81

[58] Field of Search .......... 428/200, 207, 428/914, 195, 211, 914, 40, 43, 42, 76, 174, 187, 261, 192, 198, 481, 537.5, 212, 488.4; 156/240, 277; 427/148; 283/81

[56] References Cited

U.S. PATENT DOCUMENTS

| | | | |
|---|---|---|---|
| 1,799,865 | 4/1931 | Rife . | |
| 2,220,071 | 11/1940 | Avery . | |
| 2,303,346 | 12/1942 | Flood . | |
| 3,312,005 | 4/1967 | McElroy | 428/40 |
| 3,501,365 | 3/1970 | Marshall . | |
| 3,592,722 | 7/1971 | Morgan | 428/40 |
| 4,060,168 | 11/1977 | Romagnoli . | |
| 4,150,183 | 4/1979 | Reed . | |
| 4,159,585 | 7/1979 | Brown . | |
| 4,214,024 | 7/1980 | Jacobson . | |
| 4,231,833 | 11/1980 | Lieberman . | |
| 4,313,994 | 2/1982 | Kingston | 428/200 |
| 4,379,573 | 4/1983 | Lomeli et al. . | |
| 4,425,386 | 1/1984 | Chang . | |
| 4,586,611 | 5/1986 | Scalzo . | |
| 4,729,506 | 3/1988 | Neubauer . | |
| 4,787,158 | 11/1988 | Vitol | 40/638 |
| 4,868,027 | 9/1989 | Hunkeler et al. . | |
| 4,877,177 | 10/1989 | Felix . | |
| 4,895,747 | 1/1990 | Birkholz et al. | 428/42 |
| 4,977,006 | 12/1990 | Smith et al. | 428/42 |
| 5,011,559 | 4/1991 | Felix . | |
| 5,021,110 | 6/1991 | Kobayashi . | |
| 5,021,273 | 6/1991 | Kobayashi . | |
| 5,061,170 | 10/1991 | Allen et al. . | |
| 5,098,759 | 3/1992 | Felix | 428/42 |
| 5,271,787 | 12/1993 | Hoffmann et al. | 156/268 |
| 5,299,979 | 4/1994 | Ballard | 462/18 |

FOREIGN PATENT DOCUMENTS

| | | |
|---|---|---|
| 2127378 | 4/1984 | United Kingdom . |

OTHER PUBLICATIONS

Flexo Accessories Co. Propheteer 700 Standard Features Photo and Data Sheet.

Webtron 1000 Drawing and Description.

Allied Gear Flexomaster I Description and Drawing.

(List continued on next page.)

*Primary Examiner*—William A. Krynski

*Attorney, Agent, or Firm*—Hovey, Williams, Timmons & Collins

[57] ABSTRACT

A business form having an integrated label in its top ply or other sheets advantageously includes a release sheet which is only partially covered with a release coating in order to provide a controlled release. The controlled release is provided by skiving lines which preferably remove a portion of the release coating within a border on the release sheet. The adhesive layer is thereby directly connected to both the label and the release sheet. The release coating is penetrated intermittently by the skiving lines to remove a portion of the release coating. Alternatively, a pattern of release coating of silicone or the like may be printed in a pattern so that the release coating is only intermittently provided in covering relationship over the release sheet. The provision of intermittent direct contact between the adhesive and the release sheet provides improved adhesion of the label to the liner without detracting from the functionality of the form or the label.

10 Claims, 4 Drawing Sheets

OTHER PUBLICATIONS

Allied Gear Felxomaster II Drawing and General Description.

Comco Equipment, Inc. Commander Drawing and Specifications.

Comco Equipment, Inc. Print Station Drawing.

Magna–Graphics MCC Flexo Press Photos and Description.

Mark Andy, Inc. Mark Andy 2200 Drawing, Specifications and Description.

Ko–Pack 250 Drawing and Description.

INTEGRATED LABEL HAVING CONTROLLED RELEASE

This application is a continuation-in-part of Application Ser. No. 08/086,185 filed Jun. 25, 1993, now abandoned, the disclosure of which is incorporated herein by reference. Applicant also incorporates by reference herein the disclosure of pending Application Ser. No. 08/069,086 filed May 29, 1993, now U.S. Pat. No. 5,405,475 and Application Ser. No. 08/077,004 filed Jun. 15, 1993, now abandoned.

BACKGROUND OF THE INVENTION

1. Field of the Invention

The present invention involves a business form having a release liner for permitting removal of a label or the like having an adhesive backing, the liner including an uncoated portion to permit better adherence to the primary sheet of the form. The liner and other sheets may be provided with carbonless transfer material to permit ease in making multiple copies of information written thereon. Additionally, the coated portion of the liner may be skived to provide enhanced adhesion to the label without impeding separation when desired.

2. Description of the Prior Art

Business forms provide commercial and industrial users with sheets which enable the quick and efficient recording of information. These forms typically are continuously produced on a printing press in a process which involves printing one or both sides of the different sheets which are layered on the form.

One type of form which enjoys significant popularity among users includes a removable label provided with a pressure-sensitive adhesive backing. To provide for easy removal of these labels, a liner having a release coating of, e.g., silicone, must be incorporated in the form next to the adhesive side of the label. This release coming allows the label to be removed from the form without tearing.

Unfortunately, this ability to release from the adhesive causes concomitant problems during manufacturing. For example, when these business forms are manufactured in a continuous process as is typical, it may be necessary to pass the forms through a turnbar assembly to enable printing or other processing on both sides. As the forms wrap around the rollers of the turnbar assembly, the release coating on the liner may provide insufficient adherence to the top sheet or label, resulting in separation of the liners or labels from the form. As the infeed rate of the forms is increased, the label or liner separation problem becomes more acute. Thus, production of the continuous forms with more efficiency at higher feed rates has been difficult to achieve.

Additionally, the use of carbonless transfer technology has enabled many forms to substitute carbonless transfer coatings for carbon paper in multi-layer business forms. For example, in U.S. Pat. No. 4,425,386, a multi-layer business form is described which provides a top sheet and an adjacent sheet each coated with complementary layers of carbonless transfer medium to permit a stylus such as a pen or typewriter to transfer the image from the top sheet to the adjacent sheet without the use of carbon paper. Another example of this technology is shown in U.S. Pat. No. 4,729,506 which provides a mailer including a front ply having a transparent window and a back ply secured thereto to define a pocket. Carbonless coating material is applied to the back of the window produce an image on the correspondingly coated insert ply.

There has arisen a need for a business form which resists premature separation of the liner or label from the top sheet and provides improved adhesive connection between the release liner and the top sheet. There has also arisen a need for a business form which includes an integrated label which also provides for carbonless transfer to an underlying ply from a stylus applied to the integrated label.

SUMMARY OF THE INVENTION

These needs have largely been met by the business form in accordance with the present invention which provides an integrated label with a liner having the ability to both release the label and adhere to the top sheet. Further, the present invention preferably also includes carbonless transfer coatings to enable transfers to additional plys or sheets from a stylus such as a pen or typewriter applied thereto. Most preferably, the invention hereof includes a business form wherein portions of the release coating have been skived to provide enhanced adhesion between the liner and the integrated label without detracting from desired separation or damaging the label during separation.

In greater detail, the present invention advantageously includes a top ply sheet in which perforations, die cut separation lines or other lines of weakness have been placed to define a label or other integrated detachable element. A liner is provided, with a layer of adhesive joining the liner to the top ply sheet. Advantageously, the liner is coated with a release coating such as, e.g., silicone, to permit release of the label, but the release coating does not extend completely across the liner, leaving an uncoated zone for contact with the adhesive. This uncoated zone preferably is located outboard of the lines of weakness whereby the label may be readily detached and the liner is adhesively attached to the top ply sheet.

The top ply sheet is preferably coated, across at least a part thereof, with a carbonless back transfer coating, while an underlying bottom or intermediate ply is coated with a carbonless front transfer coating. The carbonless transfer medium typically includes a coating containing a colorless dye between stilting material such as large granular starch and a coating applied to the facing sheet or ply containing a color developing material between similar stilting material. When a force is supplied which is sufficient to break down the stilting material so that the dye is combined with the developing material an image is created on the underlying ply. Such technology is well known in the art and is shown, for example, in U.S. Pat. Nos. 4,425,386; 4,275,905; 3,767,451 and 3,632,378 the disclosures of which are incorporated herein by reference.

The liner may be made of paper or film, and the film may be clear or opaque. Plural uncoated zones are preferably provided on the liner, the zones extending along the sides of the liner according to the direction of travel during manufacture, extending transversely, or extending all around the perimeter of the liner to provide enhanced adherence to the top ply sheet. The label may be located anywhere on the top ply sheet and particularly may be positioned such that remainder portions of the top ply sheet surround the label. The adhesive may be of a conventional type of pressure sensitive adhesive or alternatively may be a thermosetting adhesive which is heated prior to application to the label.

Most preferably, the portion of the liner covered with the release coating and located opposite the label is provided with lines of abrasion, scoring or skiving which penetrate the release coating and permit direct contact between the adhesive and the liner. The skiving lines are spaced apart along the liner so that only a portion of the release coating is removed. A controlled release between the liner and the label portion is thereby achieved. Enhanced adherence between the liner and the label is thus provided which inhibits undesired premature separation of the liner up until removal of the label portion is provided, but only a fraction of the coating is removed permitting ready removal of the label with the pressure-sensitive adhesive retained thereon.

DESCRIPTION OF THE PREFERRED EMBODIMENTS

Figure 1:
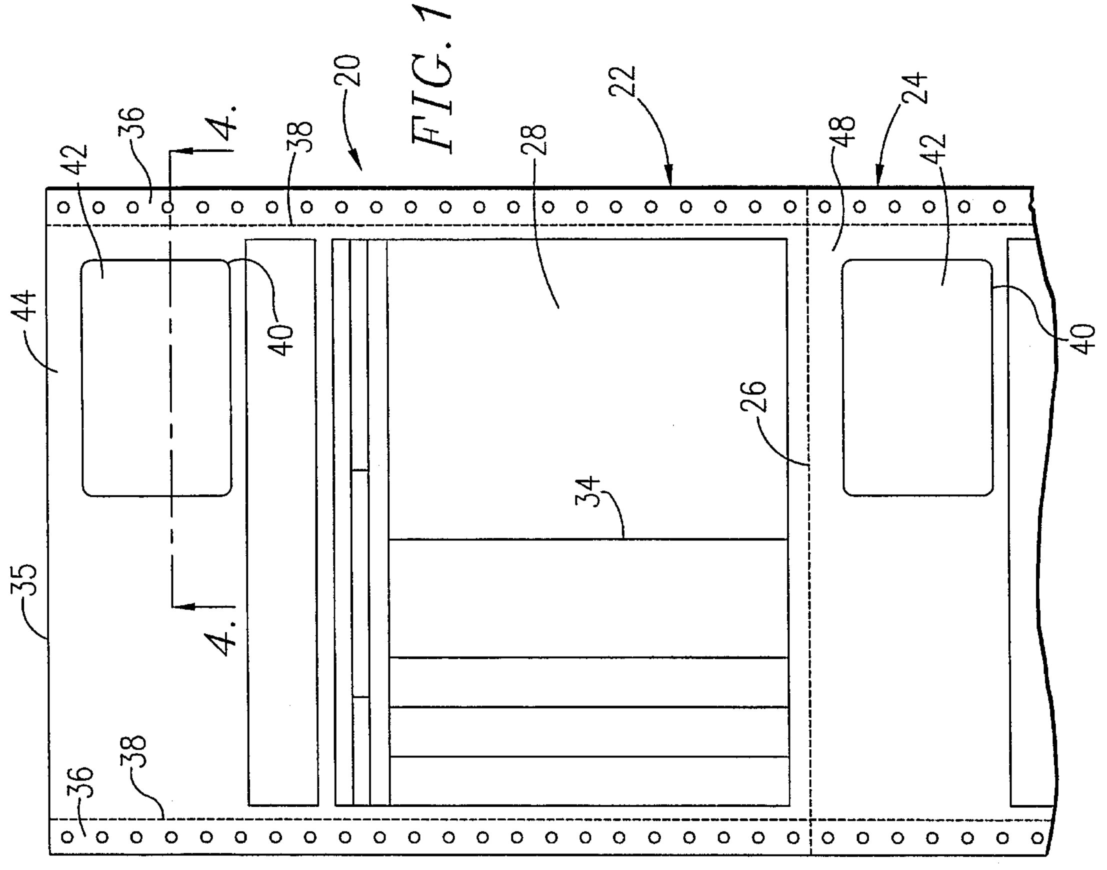
FIG. 1 is a plan view of a business form in accordance with the present invention showing a continuous form including successive form elements each having a top ply sheet presenting an integrated label.

Referring now to the drawings, a composite business form 20 is shown in FIG. 1 for continuous manufacture, and includes separable form elements 22 and 24 separated by transverse perforation 26. It is to be understood that multiple successive forms are typically printed and manufactured in a single run, that various types of printing and label location may be provided, that multiple sheets can be incorporated in the form, and that the two form elements 22 and 24 are meant to be illustrative of the many variations of the present invention.

In greater detail, form 20 includes a top ply sheet 28, an intermediate sheet 30 and a bottom sheet 32. The top ply sheet 28 is typically printed with lines, letters or other indicia 34, it being understood that the same or different indicia are typically printed on the intermediate and bottom sheets 30 and 32. The top ply sheet 28 includes a surrounding margin 34 and may include tractor feed strips 36 or the like separable along lengthwise perforations 38. The top ply sheet 28 is die-cut, scored, perforated, or otherwise provided with lines of separation or weakness 40 defining a detachable element such as integrated label 42 which may be either separable or already separated from the top ply sheet 28. The integrated label 42 is preferably surrounded by the remainder 44 of top ply sheet 28, but certainly multi-part or sectionalized labels positioned in adjacency are well within the skill of the art and typically would be backed by a release sheet 46, shown in FIGS. 2 and 3. The release sheet may be of paper, synthetic resin film or other suitable material. The top ply sheet 28 presents a front face 48 shown in FIG. 1 and a rear face 50 shown in FIG. 2.

Figure 2:
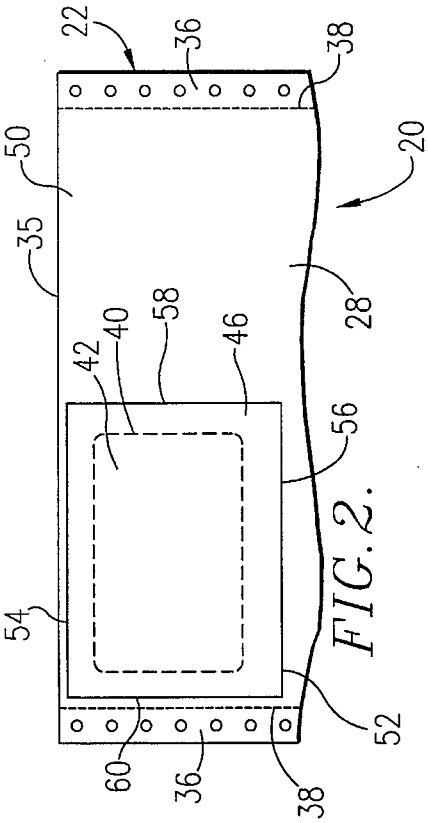
FIG. 2 is a fragmentary plan view of the reverse side of the top ply and release sheet of the form shown in FIG. 1 with lines of weakness defining the integrated label shown in phantom.
Figure 3:
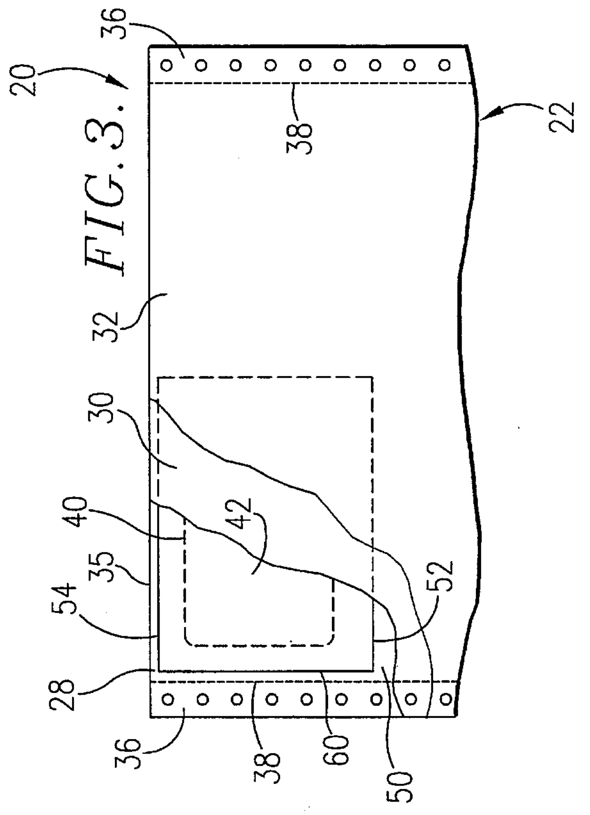
FIG. 3 is a fragmentary plan view of the reverse side of the business form of FIG. 1 showing the bottom sheet, intermediate sheet, release sheet, and top ply sheet with lines of weakness defining the integrated label shown in phantom.
Figure 4:
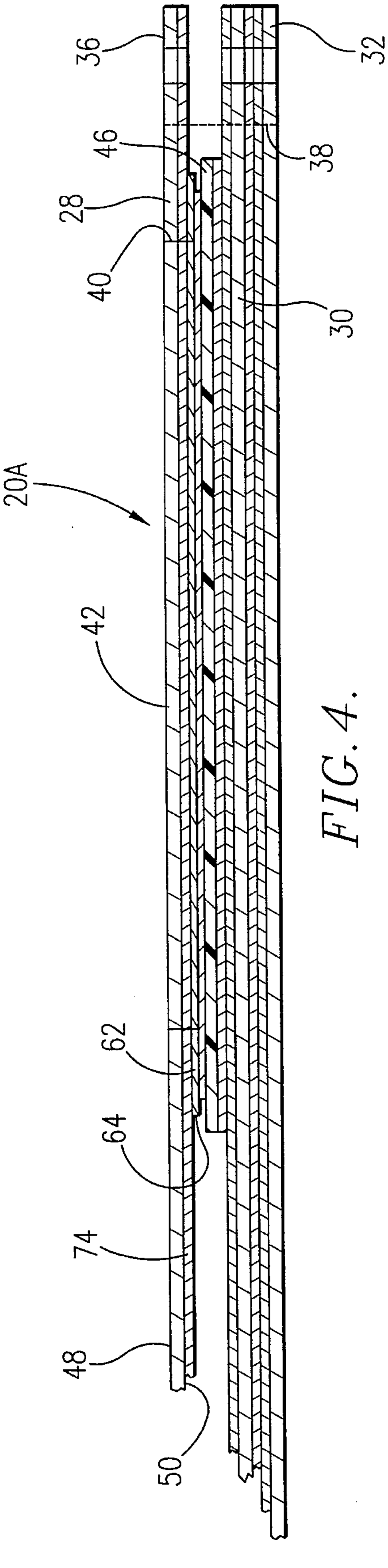
FIG. 4 is an enlarged, fragmentary vertical sectional view taken along line 4—4 of FIG. 1 showing the sheets, adhesive layers, and carbonless transfer medium layers.
Figure 5:
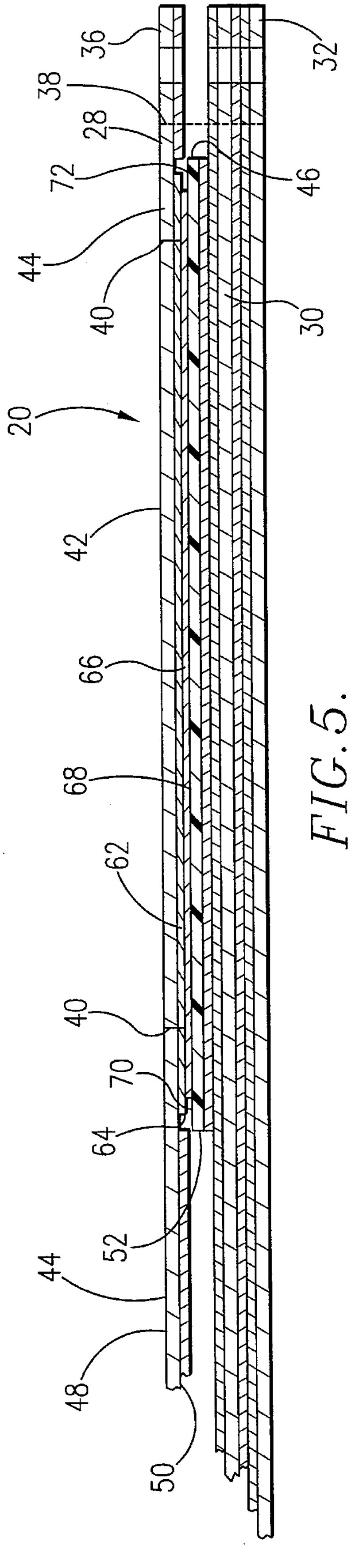
FIG. 5 is an enlarged, fragmentary vertical sectional view similar to FIG. 4, but showing a modified business form wherein the carbonless transfer medium has been eliminated in the area of the adhesive.

As may be seen in FIGS. 2, 3 and 5, the release sheet 46 is positioned adjacent the rear face 50. The release sheet 46 includes a surrounding edge 52 including a top edge 54, a bottom edge 56, and a pair of side edges 58 and 60. The edge 52 extends over the remainder 44 of the top ply sheet and thus extends beyond the lines of weakness 40. An adhesive layer 62 is applied to either the release sheet 46 or the rear face of the top ply sheet, but in any event is positioned intermediate the rear face and the release sheet 46. The adhesive layer 62 is best seen in FIG. 4 and extends within a boundary 64 beyond the lines of weakness 40 to hold the release sheet 46 to the remainder 44, but also is preferably co-extensive with or slightly interior to the edge of the release sheet to avoid undesired spill-over. The adhesive is preferably any of the pressure-sensitive adhesives applicable by screen or flexographic printing, slot die or the like, and can also be a hot-melt thermoplastic adhesive applicable through a heated slot die, both adhesives being well known to those skilled in the art.

A release coating layer 66 is applied to the release sheet 46 and is located between the release sheet 46 and the adhesive layer 62. The release coating is of a silicone type well known to those skilled in the art, and applied by rollers from an enclosed doctor blade or other well-known means. The release coating layer 66 is applied to a release zone 68 on the release sheet 48 in an area within the outside boundary 64 of the adhesive layer 62, thereby presenting release coating-free zones 70 and 72 along the boundary of the adhesive layer and the edge of the release sheet 46. The coating-free zones 70 and 72 thereby permit direct contact between the adhesive layer 62 and the release sheet 46 without the release coating interfering with the adhesive contact.

As shown in FIG. 5, the lines of weakness 40 created by, e.g., die cutting, extend through the label 42 and into the underlying adhesive layer 62. This enables the label 42 to be peeled from the surrounding remainder 44 of the top ply sheet 28 together with the portion of the adhesive layer within the lines of weakness 40 and leaving the release layer within the release zone 68 on the release sheet 46.

The present invention also contemplates the inclusion of carbonless transfer medium layers, typically including coatings of a colorless dye suspension on one sheet and a developing coating on the opposing face of the adjacent sheet. FIG. 4 also shows a modified business form 20A wherein a carbonless back (hereinafter CB) layer 74, typically including a microcapsules of colorless dye suspended within stilting material such as large granule wheat starch, extends across the top ply sheet 28, whereas in the embodiment shown in FIG. 5, the CB layer 74 extends only adjacent the adhesive layer 62 and does not impact on the adhesive contact between the adhesive layer 62 and the detachable label 42. In both embodiments shown in FIGS. 4 and 5, a carbonless front (CF) layer 76, typically including a coating of color developing material, is applied to the intermediate sheet 30 across the top surface 78 thereof. A CB coating layer is also applied to the rear of the release sheet 46 in facing relationship to the CF layer 76.

In use, the forms 20 and 20A allow the user to write or type on the label 42, with that inscription being transferred by the carbonless media to the intermediate sheet 30 and back sheet 32. The release sheet 46 remains attached to the top ply sheet 28 while the label 42, which had been an integrated part of the top ply sheet 28, may be peeled away and attached elsewhere by virtue of the pressure-sensitive adhesive layer 62 carried therewith. The release sheet 46 resists separation from the top ply sheet 28 by virtue of the coating-free zones 44 which ensure firm adhesive contact between the top ply sheet, the adhesive layer, and the release sheet.

FIGS. 6, 7, 8, 9 and 10 illustrate an alternate embodiment of the present invention which omits the use of carbonless transfer media. Form 80 is also a continuous business form comprised of form elements; in the case of form 80, the form elements 82 and 84 may be defined by transversely extending perforation lines 86 which separate the form elements along the length of manufacture of the form 80. Alternatively, form elements 88 and 90 may be separated across the form by longitudinally extending perforation lines 92. Labels 94 are integrally formed in the form 80 by scoring defining circumscribing lines of weakness 96, although it may be appreciated that the labels could also be formed by perforations 98 at a corner or along an edge of the top ply sheet 100 of the form 80.

Figure 7:
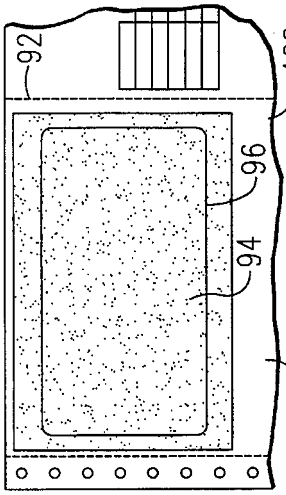
FIG. 7 is a fragmentary plan view of the reverse side of the top ply of the form of FIG. 6 with the liner removed to show the adhesive layer.
Figure 8:
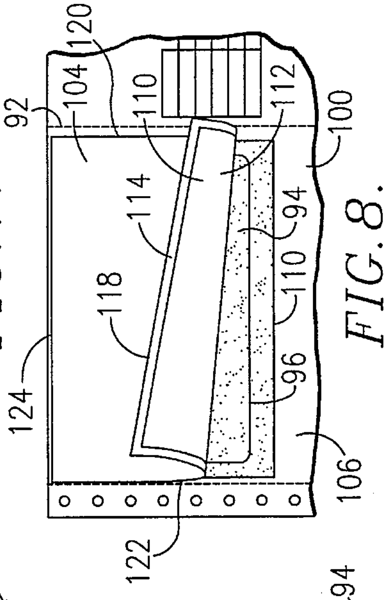
FIG. 8 is a fragmentary plan view similar to FIG. 7 but showing the addition of the release sheet with the coating-free zones along the edge.
Figure 9:
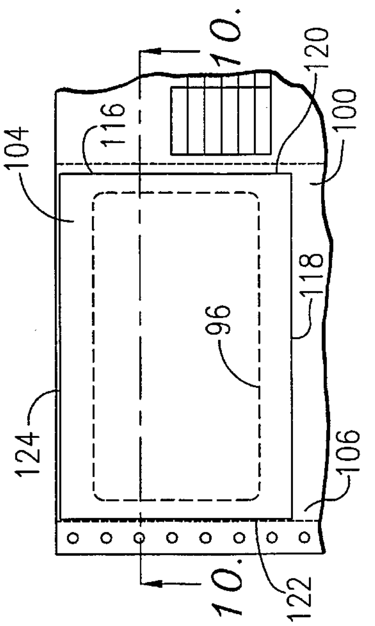
FIG. 9 is a fragmentary plan view similar to FIG. 8 but showing the release sheet fully applied to the top ply sheet.
Figure 6:
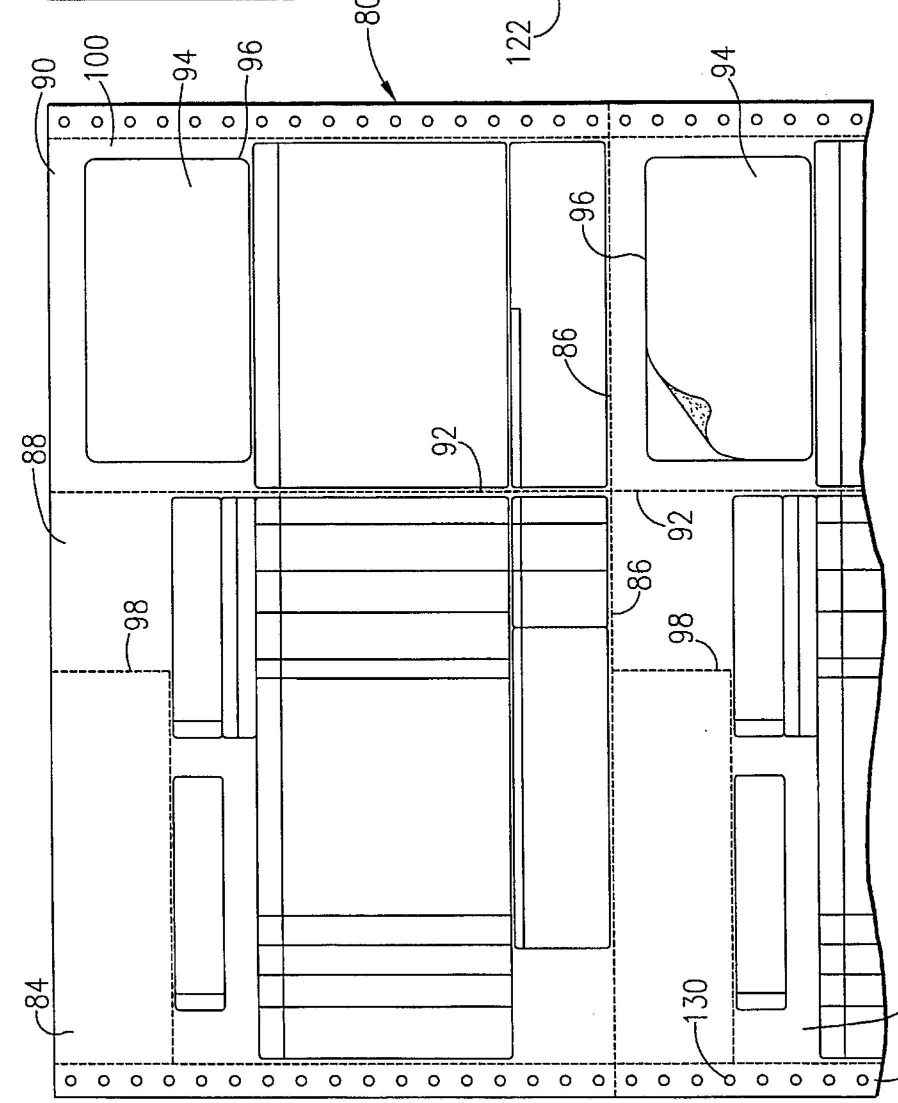
FIG. 6 is a plan view of an alternate business form in accordance with the present invention showing successive form elements with integrated labels, each form element being separable along transverse perforations.
Figure 10:
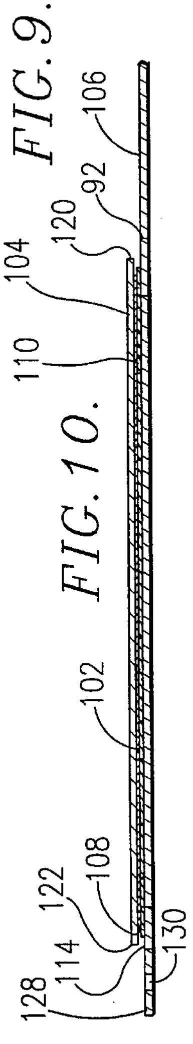
FIG. 10 is a fragmentary cross-sectional of the business form of FIG. 6 taken along line 10—10 of FIG. 9.

As may be seen in FIGS. 7, 8 and 9, an adhesive layer 102 is applied to the top ply sheet 100 between a release sheet 104 and the rear face 106 of the top ply sheet 100. The adhesive layer extends within a boundary 108 which extends outward of the lines of weakness 96 relative to the label. The release sheet 104 is coined with a release coming 110 of, e.g., silicone in a release zone 112. As shown in FIG. 9, the release zone 112 is relatively interior to the boundary 108 and is surrounded on the release sheet 104 by a coating-free zone 114. The coating-free zone 114 extends around the edge 116 of the release sheet 104 including bottom edge 118, side edges 120 and 122, and top edge 124. FIG. 10 shows the form 80 with the release sheet 104 attached to the rear face of the top ply sheet 100, it being seen that the release sheet 104 occupies only a fraction of the area of the top ply sheet 100. The form 80 may include additional layered sheets as in form 20, joined along tractor feed tabs 126 and 128 by gluing, crimping or the like. Holes 130 are longitudinally spaced along the tabs 126 and 128 for conventional uses.

The use of coating-free zones substantially eliminates the problem of "flying" release sheets caused by sharp routing around turnbars and the like during manufacture. Increased adherence to the top ply sheet (or other sheets, as desired) by the release sheets by immediate contact between the adhesive and the release sheet without any release coating provides significant improvements over the prior art. In addition, carbonless transfer media applied between the back of the release sheet and other sheets permits more of the underlying sheets to be used for recording information, and especially the important information inscribed on the removable integrated label.

Figure 11:
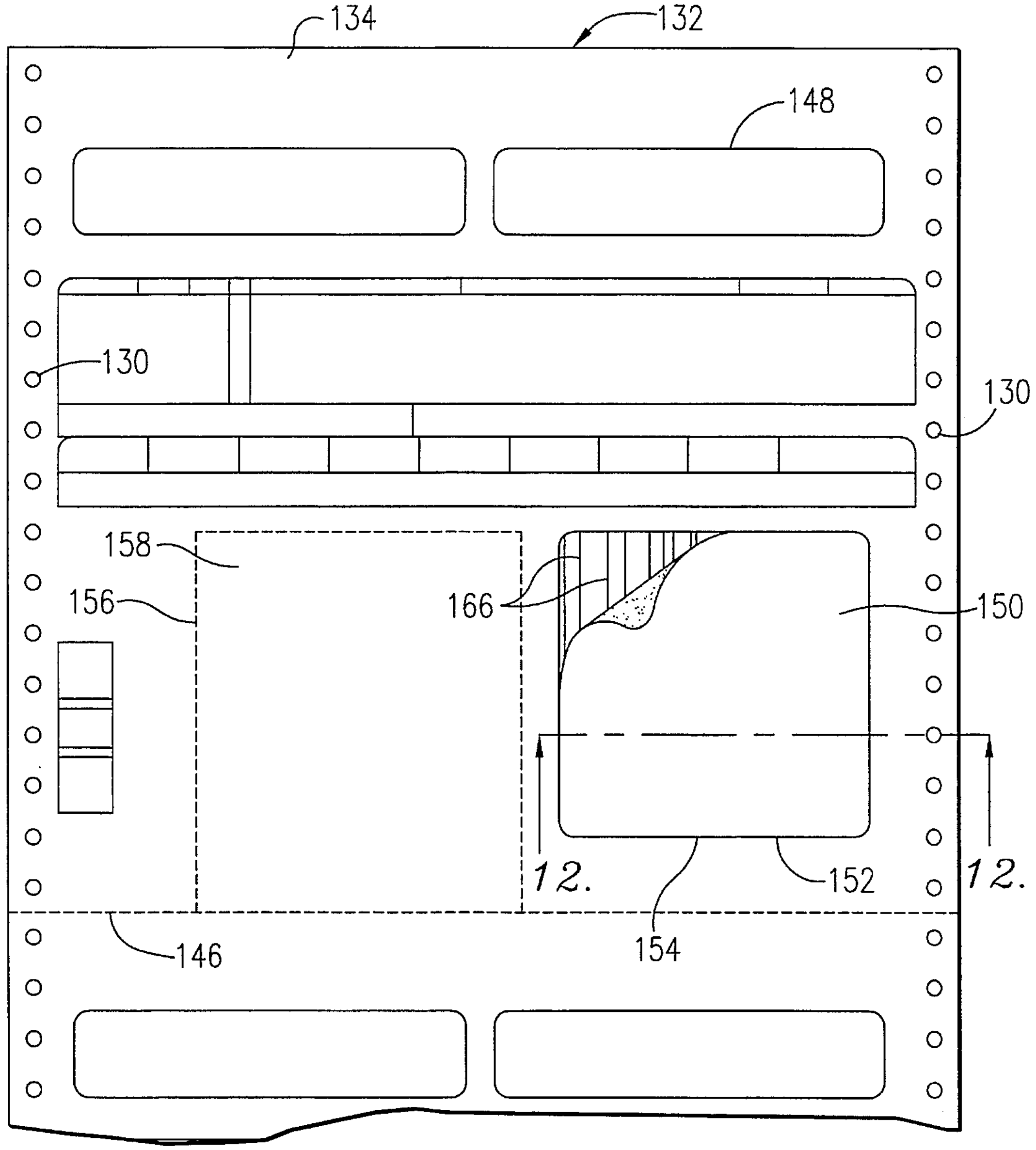
FIG. 11 is a plan view of a second alternate business form in accordance with the present invention wherein the side of the release liner facing the label has been skived.
Figure 12:
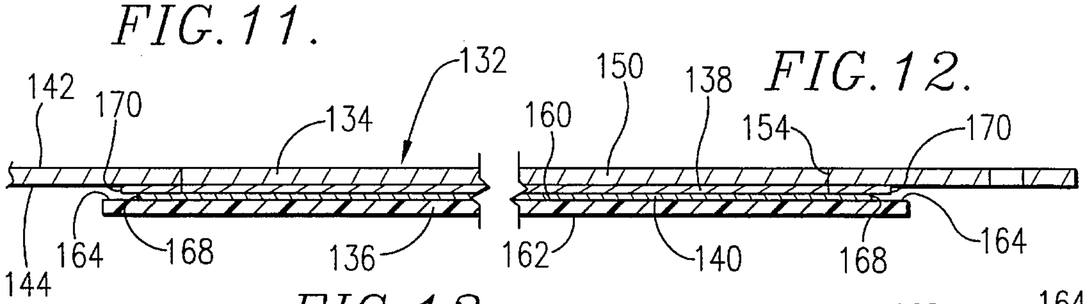
FIG. 12 is a fragmentary, diagrammatic vertical sectional view of the second alternate business form of FIG. 11 showing the top ply sheet, the adhesive layer, the release coating and the liner.
Figure 13:
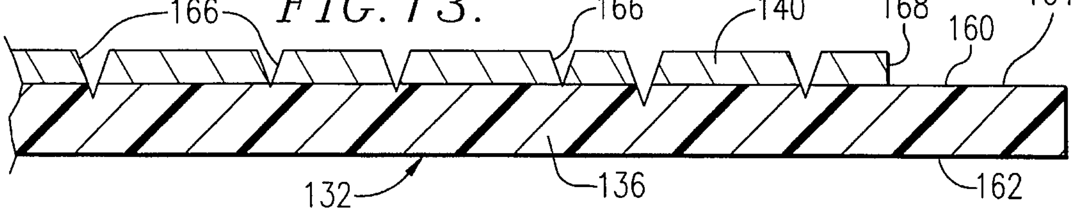
FIG. 13 is an enlarged, fragmentary, diagrammatic vertical sectional view similar to FIG. 12 showing the skiving lines penetrating the release coating over the liner.

A second alternate embodiment of the present invention is shown in FIGS. 11 through 13. A business form 132 in accordance with the second alternate embodiment broadly includes a top ply sheet 134, a release sheet 136, a layer of pressure-sensitive adhesive 138 and a layer of release coating 140, typically a silicone release coating. While additional sheets may be added either above the top ply sheet 134 or below the release sheet 136 as described hereinabove, such technology is conventional and well known to those skilled in the art, and thus will not be described in greater detail here. Further, carbonless transfer media may be employed between the plys as described hereinabove.

The top ply sheet 134 includes a first face 142 and a second face 144 and may be manufactured as a continuous business form as shown generally in FIG. 11, each individual form being separated from the next succeeding form by a transversely extending line of weakness such as perforation line 146. Various indicia 148 may be printed on either or both the first face 142 or the second face 144 as may be desired for transmitting or recording information thereon. A label 150 is defined in the top ply sheet 134 by a line of weakness 152. As used herein, a line of weakness is intended to include both lines of separation 154 which completely sever the label 150 from the surrounding portions of the top ply sheet 134 by die-cutting or the like, as well as scoring lines or perforations 156 wherein a second label 156 remains attached to the remaining portions of the top ply sheet until separation therefrom is desired.

The layer of adhesive 138 is located on the second side 144 of the top ply sheet 134 and preferably substantially covers the corresponding second side of the label 150 within the area defined by the surrounding lines of weakness 152. While the adhesive may be applied in a pattern by screen printing or other means and thus only a portion of the total area of the second side of the label 150 would be actually covered by the adhesive, and alternately strips of adhesive could be applied, such practices are well known to those skilled in the art and are intended to be encompassed by the present invention. The layer of adhesive 138 preferably extends beyond the area defined by the label 150 and into the surrounding portions of the top ply sheet. Thus, the area occupied by the layer of adhesive 138 includes and extends beyond the area of the label 150.

The layer of release coating 140 is applied to the release sheet 136 which may be of a thermoplastic film or paper, or such other material as may be desired to receive the release coating thereon. The release sheet 136 includes a front face 160 and a back face 162, the layer of release coating 140 being applied to the front face 160. Preferably, the area occupied by the layer of release coating is less than the area of the release sheet 136, and less than the area of the layer of adhesive 138, whereby a coating-free area 164 is defined between the adhesive layer 138 and release sheet 136 without intervention by the layer of release coating 140. This permits direct adhesive engagement between the layer of adhesive and both the top ply sheet 134 and the release sheet 136 for enhancing retention of the release sheet on the top ply sheet.

Most preferably, as shown in FIG. 13, portions of the layer of release coating 140 are intermittently removed by skiving lines 166. The skiving lines 166 remove the release coating 140 at spaced intervals which may be predetermined or random on the front face of the release sheet 136. Typically, the release coating would be provided in a thickness of about 1 mil and the overall thickness of the release coating and the release sheet would be about 2 mil at most. The skiving lines 166 remove a portion of the release coating therealong and may penetrate to an overall thickness of about 0.5 mil. This provides enhanced adhesion between the layer of adhesive and the release sheet 136 without providing corresponding weakening therein which would cause the release sheet to break or fracture along the skiving lines 166.

The skiving lines 166 may typically be provided by any sort of material which will abrade the coating at intervals without removing all of the coating, which would cause excessive adhesion between the label 150 and the release sheet 136. For example, rasps, files, steel wool, wire brushes and sand paper may be used to scratch away the release coating on the front face of the release sheet 136. Most preferably, it has been found that using emery cloth wrapped around a roller and applied at a pressure of about 0.2–3 lbs per linear inch provides excellent skiving of the release sheet to skive only a portion of the release coating. Additionally, the coating-free areas on opposing longitudinally extending sides of the release sheet 136 may be provided by using brushes to remove the release coating thereon. It is to be understood that a conventional release coating used in such forms is a silicon release coating well known to those skilled in the art.

Alternatively, the release coating may be initially applied to the release sheet 136 in a pattern whereby alternate regions of coated and uncoated surface of the top face of the release sheet are provided. Thus, the release coating may be initially applied so that only partial coverage of the area within the boundary 168 of the release coating is covered thereby. This also provides uncoated spaces where the adhesive layer 138 may adhere directly to the release sheet 136 without intervention of the release coating 140.

In manufacturing the business form of the present invention, the top ply sheet 134 is typically initially printed and perforated with holes 130 as described hereinabove and a layer of adhesive is applied within a border 170 by a slot die, printing roller or the like. The release sheet 136 is routed through a machine which applies a layer of release coating thereto either continuously or in a pattern as described hereinabove. If the silicon coating is continuously applied the release sheet is then provided with the skiving lines 166 by passing the release sheet through an emery cloth roller and most preferably brushes are used to remove the release coating along the edges of the release sheet 136 to provide for a coating-free zone 164. The release sheets are then cut and mated to the second face of the top ply sheet 134 in covering relationship to the intended label area 150. The label 150 is then defined by die-cutting lines of weakness 152 to sever the label from the surrounding portions of the top ply sheet making it readily detachable for removal and subsequent application elsewhere. Because of the skiving lines 168, enhanced retention of the label 150 to the release liner is provided so that during subsequent processing of the business form 132, the label 150 is retained in place. On the other hand, the adhesive bond to the release sheet 136 is not so great that the adhesive remains attached thereto, and thus the label's commercial qualities are not adversely affected.

In use, the label 150 adheres to the release sheet 136 by an incremental amount corresponding to the amount of the release coating layer 140 removed by; skiving or the open areas of the pattern of release coating layer printed on the release sheet, thereby controlling the release of the label 150. However, the label 150 is nonetheless readily peeled away from the top ply sheet 134 and the pressure-sensitive adhesive layer 138 remains attached thereto for affixing the label 150 to a desired substrate.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims.

We claim:

1. A composite business form comprising:

a top ply sheet having a surrounding margin, a front face and a rear face, said top ply sheet including at least one line of weakness defining a label element located within said surrounding margin, said label element having a surrounding perimeter substantially corresponding to said at least one line of weakness;

a release sheet positioned adjacent said rear face, said release sheet having a top edge, a bottom edge, and a pair of side edges, at least one of said side edges extending beyond the line of weakness in the adjacent top ply sheet defining the label element;

a layer of adhesive located intermediate said rear face and said release sheet and extending to a boundary positioned beyond at least one line of weakness defining the label element within the adjacent to ply sheet; and a layer of release coating located intermediate said release sheet and said adhesive layer and defined within a surrounding border with intermittent coating-free areas defined by skiving lines at intervals provided within the border to provide intermittent direct contact between the adhesive and the portion of the release sheet within the border, there being an interface between said release coating and said release sheet, at least certain of said skiving lines being defined by opposed, generally converging marginal surfaces of said release coating, at least some portions of said skiving lines extending below said interface between said release coating and said release sheet and into said release sheet.

2. A composite business form as set forth in claim 1, wherein said release coating is initially substantially continuously applied within said border, with said intermittent coating-free area being defined by said skiving lines at said intervals within said border through said release coating to expose portions of said release sheet to direct contact with said adhesive.

3. A composite business form as set forth in claim 2, wherein said border of said release coating encloses a smaller area than the area enclosed by the corresponding boundary of the layer of adhesive, whereby a substantially release-coating free zone is defined on said release sheet outside the border of said release coating in direct contact between the adhesive and the release sheet in said release coating-free zone.

4. A composite business form as set forth in claim 3, wherein said release coating-free zone substantially surrounds said border with said corresponding adhesive layer opposite said release coating-free zone extending in substantially surrounding relationship to said border for adhering said release sheet directly to said top ply sheet.

5. A composite business form as set forth in claim 2, wherein said skiving lines are intermittently spaced and substantially parallel, linear orientation.

6. A composite business form as set forth in claim 2, wherein said skiving lines are of varying depth.

7. A composite business form as set forth in claim 6, wherein said skiving lines do not perforate said release sheet.

8. A composite business form as set forth in claim 1, wherein said label element is separable along said line of weakness not completely severing said label element from said top ply sheet.

9. A composite business form as set forth in claim 1, wherein said label element is separated from said top ply sheet by a line of weakness defined by a die cutting line completely severing said label element from said top ply sheet, whereby said label element is retained in position within said line of weakness by the adhesive contact between said label element and said release sheet and said release sheet and said top ply sheet.

10. A composite business form comprising:

a top ply sheet having a front face and a rear face and including a detachable label portion defined by at least one line of weakness;

a release sheet having a plurality of edges and positioned adjacent said rear face;

a layer of adhesive located intermediate the label portion of the top ply sheet and the release sheet; and a layer of release coating located intermediate said release sheet and said adhesive layer and defined within a surrounding border, said border having at least one dimension extending on said release sheet beyond the corresponding and opposing line of weakness, said layer of release coating including intermittent coating-free areas within said surrounding border for direct contact between said adhesive and said release sheet, said intermittent coating-free areas being defined by skiving lines at intervals provided within said border to provide intermittent direct contact between the adhesive and the portion of the release sheet within the border;

there being an interface between said release coating and said release sheet, at least certain of said skiving lines being defined by opposed, generally converging marginal surfaces of said release coating, at least some portions of said skiving lines extending below said interface between said release coating and said release sheet and into said release sheet.

* * * * *